United States Patent
Kishore et al.

(10) Patent No.: US 11,237,587 B1
(45) Date of Patent: Feb. 1, 2022

(54) ON-CHIP CLOCK CONTROLLER (OCC) MANAGER BASED TURBO CAPTURE CLOCKING

(71) Applicant: QUALCOMM Incorporated, San Diego, CA (US)

(72) Inventors: Punit Kishore, Bangalore (IN); Ankit Goyal, Bangalore (IN); Srinivas Patil, Austin, TX (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/121,580

(22) Filed: Dec. 14, 2020

(51) Int. Cl.
*G06F 1/04* (2006.01)
*G06F 1/08* (2006.01)
*G06F 1/14* (2006.01)

(52) U.S. Cl.
CPC . *G06F 1/08* (2013.01); *G06F 1/14* (2013.01)

(58) Field of Classification Search
CPC ..................................... G06F 1/08; G06F 1/14
USPC ......................................................... 327/291
See application file for complete search history.

(56) References Cited

U.S. PATENT DOCUMENTS

| | | | | |
|---|---|---|---|---|
| 7,512,858 B2* | 3/2009 | Rivoir | ............. | G01R 31/31709 714/744 |
| 8,050,373 B2* | 11/2011 | Buchwald | ............... | H04L 25/20 375/356 |
| 8,970,276 B1* | 3/2015 | McShea | ................. | H03K 5/135 327/269 |
| 2015/0171832 A1* | 6/2015 | Kuo | ....................... | H03K 5/135 327/166 |
| 2017/0115351 A1* | 4/2017 | Datla Jagannadha | | ...................... G01R 31/2803 |
| 2018/0212595 A1* | 7/2018 | Barowski | ............... | G11C 11/413 |
| 2018/0348301 A1* | 12/2018 | McKiernan | ......... | G06F 11/2268 |

* cited by examiner

*Primary Examiner* — Ryan Jager
(74) *Attorney, Agent, or Firm* — Loza & Loza, LLP

(57) ABSTRACT

Aspects of the disclosure are directed to clock management. In accordance with one aspect, a clock management apparatus for built-in self-test (BIST) circuitry includes a plurality of local clock controllers; a plurality of clock generators coupled to the plurality of local clock controllers; a master clock controller coupled to the plurality of clock generators; an X-tolerant logical built-in self test (XLBIST) circuit coupled to the master clock controller; and a test access port (TAP) coupled to the XLBIST circuit.

30 Claims, 9 Drawing Sheets

| DELAYSEL | SLOT_POSITION | CLKSEL | SLOT0 | SLOT1 | SLOT2 | SLOT3 | SLOT4 | SLOT5 | SLOT6 |
|---|---|---|---|---|---|---|---|---|---|
| 2'b00 | 0 | 8'h00 | CLK0 | CLK1 | CLK2 | CLK3 | CLK4 | CLK5 | CLK6 |
| 2'b01 | 1 | 8'h55 | CLK0 | CLK1 | CLK2 | CLK7 | CLK8 | CLK9 | CLK3 |
| 2'b10 | 2 | 8'hAA | CLK0 | CLK1 | CLK2 | CLK10 | CLK11 | CLK12 | CLK4 |
| 2'b11 | 3 | 8'hFF | CLK0 | CLK1 | CLK2 | CLK13 | CLK14 | CLK15 | CLK5 |

*← 1100*

Display Sub-system

| Mode | Coverage | Patterns | Reseed | Run Time (ms) |
|---|---|---|---|---|
| Conventional | 83.47% | 3695 | 47 | 12.3 |
| OCCMgr | 84.41% | 2253 | 24 | 5.3 |

Safety Manager Sub-system

| Mode | Coverage | Patterns | Reseed | Run Time (ms) |
|---|---|---|---|---|
| Conventional | 85% | 2000 | 200 | 35 |
| OCCMgr | 85% | 4300 | 45 | 10 |

CPU Sub-system
 L2 Rams Has MCP from Write-logic Which Prevented Pattern Generation
 We were able to Generate Patterns After Implementing OCCMgr

FIG. 11

ON-CHIP CLOCK CONTROLLER (OCC) MANAGER BASED TURBO CAPTURE CLOCKING

TECHNICAL FIELD

This disclosure relates generally to the field of clock management of integrated circuits (ICs), and, in particular, to On-Chip Clock Controller (OCC) managers.

BACKGROUND

Integrated circuits (ICs) include logic cells to perform various logical operations and memory cells to store data and instructions. Current integrated circuits have a very high quantity of logic cells and memory cells on a single monolithic structure. Because of this complexity, many ICs incorporate internal built-in self-test (BIST) circuitry to diagnose circuit faults or failures. For logic cells, logical built-in self-test (LBIST) circuitry is used to test logic cells. However, often the details of the logic cells are unknown (known as x-logic) so that it is difficult to perform robust clock management for the LBIST circuitry. As a result, a conservative clock management approach may be used to avoid possible timing problems in the LBIST circuitry where only one on-chip clock controller (OCC) is active during each capture window. However, this approach is often inefficient since substantial timing overhead is needed to activate each OCC sequentially. There is a need for more efficient clock management for LBIST circuitry.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides clock management of integrated circuits (ICs). Accordingly, a clock management apparatus for built-in self-test (BIST) circuitry including a plurality of local clock controllers; a plurality of clock generators coupled to the plurality of local clock controllers; a master clock controller coupled to the plurality of clock generators; an X-tolerant logical built-in self test (XLBIST) circuit coupled to the master clock controller; and a test access port (TAP) coupled to the XLBIST circuit.

In one example, the master clock controller is configured to enable or disable one or more clock activation signals. In one example, the master clock controller is configured to manage one or more clock activation signals for the plurality of clock generators using a plurality of time slots within a capture window and a plurality of time delays within each of the plurality of time slots. In one example, at least one of the plurality of local clock controllers is configured to manage at least one of the plurality of clock generators.

In one example, the XLBIST circuit is configured to manage an operation of the master clock controller and the TAP is configured to allow access to the XLBIST circuit. In one example, the access to the XLBIST circuit through the TAP allows configuring a management of the operation of the master clock controller.

In one example, the plurality of clock generators includes at least one dominant clock generator and at least one non-dominant clock generator, wherein the at least one dominant clock generator includes at least one dominant clock domain and the at least one non-dominant clock generator includes at least one non-dominant clock domain.

In one example, the at least one dominant clock generator is ranked in a priority order. In one example, the priority order is based on a number of floating point operations per second (FLOPS) in each of the at least one dominant clock domain. In one example, the at least one non-dominant clock generator is configured to activate using a bank-based clock controller chain.

Another aspect of the disclosure provides a method for clock management for a built-in self-test (BIST) circuitry including managing one or more clock activation signals for a plurality of clock generators using a plurality of time slots within a capture window and a plurality of time delays within each of the plurality of time slots; and generating a plurality of clocks using the plurality of clock generators.

In one example, the managing the one or more clock activation signals includes enabling or disabling the one or more clock activation signals. In one example, the method further includes managing a plurality of local clock controllers. In one example, the method further includes managing the plurality of clock generators using a master clock controller.

In one example, the method further includes managing an X-tolerant logical built-in self test (XLBIST) circuit coupled to the master clock controller. In one example, the method further includes managing a test access port (TAP) coupled to the XLBIST circuit. In one example, the method further includes configuring the XLBIST circuit to manage an operation of the master clock controller and configuring the TAP to allow access to the XLBIST circuit.

In one example, the plurality of clock generators includes a plurality of dominant clock generators and a plurality of non-dominant clock generators. In one example, the method further includes using the plurality of dominant clock generators to generate a plurality of dominant clock domains. In one example, the method further includes using the plurality of non-dominant clock generators to generate a plurality of non-dominant clock domains In one example, the method further includes generating a priority order for the plurality of dominant clock generators. In one example, the priority order is based on a number of floating point operations per second (FLOPS) in each of the plurality of dominant clock domains. In one example, the method further includes activating at least one of the plurality of non-dominant clock generators with a bank-based clock controller chain.

In one example, each of the one or more clock activation signals is active within at least one of the plurality of time slots within the capture window. In one example, the each of the one or more clock activation signals is active after one of the plurality of time delays within each of the plurality of time slots.

Another aspect of the disclosure provides an apparatus for clock management for a built-in self-test (BIST) circuitry including means for managing one or more clock activation signals for a plurality of clock generators using a plurality of time slots within a capture window and a plurality of time delays within each of the plurality of time slots; and means for generating a plurality of clocks using the plurality of clock generators. In one example, the apparatus further includes means for managing the plurality of clock generators. In one example, the apparatus further includes means for managing the at least one of the plurality of clock generators using one of the plurality of time delays.

Another aspect of the disclosure provides a non-transitory computer-readable medium storing computer executable code, operable on a device including at least one processor and at least one memory coupled to the at least one processor, wherein the at least one processor is configured to implement a clock management for a built-in self-test (BIST) circuitry, the computer executable code including instructions for causing a computer to manage one or more clock activation signals for a plurality of clock generators using a plurality of time slots within a capture window and a plurality of time delays within each of the plurality of time slots; and instructions for causing the computer to generate a plurality of clocks using the plurality of clock generators. In one example, the non-transitory computer-readable medium further includes instructions for causing the computer to manage the at least one of the plurality of clock generators using one of the plurality of time delays.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

FIG. 11 illustrates example test performance comparisons for three subsystems using conventional and improved X-tolerant logical built-in self-test (XLBIST) architectures.

DETAILED DESCRIPTION

Figure 1:
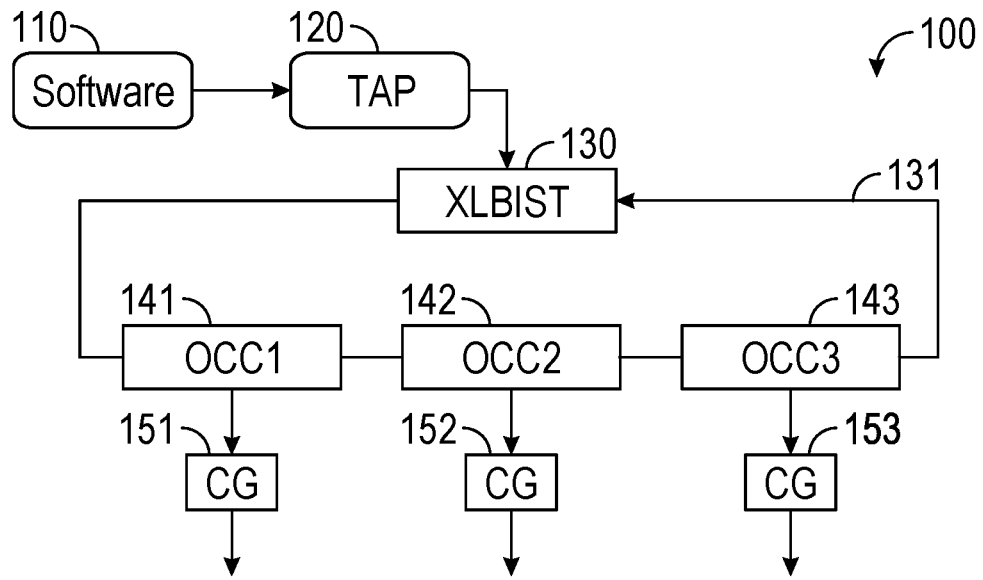
FIG. 1 illustrates an example block diagram of an X-tolerant logical built-in self-test (XLBIST) architecture with local clock controllers.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Integrated circuits typically include many billions of transistors which form, for example, logic cells and memory cells. Logic functions may be implemented using logic cells, and memory functions may be implemented using memory cells. Due to the immense quantity of logic cells and memory cells in a single integrated circuit, operational reliability of the IC must be periodically validated using some type of test. One type of test is the built-in self-test (BIST) which uses internal circuitry to interrogate, detect, diagnose, and recover from circuit faults or failures. Specifically, logical built-in self-test (LBIST) circuitry may be used to test logic cells within the IC. Also, memory built-in self-test (MBIST) circuitry may be used to test memory cells within the IC.

In one example, some system applications which use ICs may have strict safety requirements which impact the LBIST circuitry design. For example, in automotive applications, an IC, such as a system on a chip (SoC), must comply with automotive safety requirements (such as automotive safety integrity level (ASIL)) for in-system test features. For example, during power up/power down cycles, system tests are executed by the IC using the LBIST circuitry, as well as during active operation. In addition, these system tests must comply with strict test time allocations. For example, system test execution time requirements are typically non-negotiable, and test execution time duration may affect customer satisfaction. For example, a rapid mission-mode test mechanism may provide a significant competitive advantage in the automotive business market.

A test sequence may be used to manage a plurality of built-in self-tests. For example, a test sequence may be a series of management directives for activating and deactivating a plurality of clock generators. In one example, clock generators are used to produce clock signals for logic cells and memory cells in an IC. For example, a LBIST test sequence may be used for testing logic cells in the IC, and a MBIST test sequence may be used for testing memory cells in the IC. For example, clock signals may be used to manage state transitions in logic cells and memory cells in a synchronous manner. For example, a state transition is a change from a current state to a next state for a logic cell or a memory cell.

In one example, an IC may need about 300 ms to execute a LBIST test sequence, but have a requirement to complete the LBIST test sequence within 50 ms. For example, LBIST test sequence execution time may be reduced to approximately 100 ms using concurrency, subject to power (di/dt and peak) and thermal constraints.

One issue with testing logic cells is that specific details of some logic cell designs may not be known to the designer of the LBIST circuitry (also known as x-logic or x-sources). For example, certain logic cells (e.g., sequential logic cells) may have unobservable or hidden states. For example, certain logic cell designs may be imported into the IC from a third-party source (e.g., circuit intellectual property).

In one example, an X-tolerant LBIST (XLBIST) module is a LBIST circuit which is designed to accommodate unknown logic cells (i.e., x-logic). Clock management for the XLBIST module may require an overly conservative design approach due to unknown timing constraints in the unknown logic cells. That is, all clock domains are assumed to be asynchronous. For example, a plurality of clock domains may be part of the XLBIST module, and each clock domain may be sequentially activated which results in a longer XLBIST test sequence execution time. In one example, a clock domain is a plurality of logic cells or memory cells which operate synchronously.

In one example, a master clock controller architecture may reduce XLBIST test sequence execution time by management of a plurality of clock generators. In one example, the master clock controller architecture is scalable to any number of clock domains.

FIG. 1 illustrates an example block diagram 100 of an X-tolerant logical built-in self-test (XLBIST) architecture with local clock controllers. A software module 110 provides instructions (e.g., management directives) and data through a test access port (TAP) 120 to a XLBIST module 130. In one example, the XLBIST module 130 provides management directives via a management bus 131 to a first local clock controller 141, a second local clock controller 142 and a third local clock controller 143.

For example, the first local clock controller 141 controls a first clock generator 151, the second local clock controller 142 controls a second clock generator 152 and the third local clock controller 143 controls a third clock generator 153. In one example, the first clock generator 151 generates a first clock signal, the second clock generator 152 generates a second clock signal and the third clock generator 153 generates a third clock signal.

In one example, the XLBIST module 130 uses the local clock controllers 141, 142, 143 to control clock generation in each clock domain by following an approach of activating a single local clock controller or a single clock generator during a capture window. In one example, a capture window is a contiguous time interval where test data is captured. For example, this approach may facilitate managing timing exceptions (e.g., x-sources) during the capture window due to inter-clock domain false paths. However, this approach may create significant test time overhead in ICs with a large number of clock domains.

For example, by default, all XLBIST clock domains may be treated as asynchronous and only those clock generators with no paths between clock domains may be activated together. This feature limits the number of clock generators which may be activated in a capture window and impacts time execution time since a separate test pattern is needed for all such interacting clock domains.

For example, to switch a clock generator from a first local clock controller to a second local clock controller, the second clock controller requires a reload of initialization parameters which may use a slow clock (e.g., 19.2 MHz). During this reload process, registers in the XBIST module 130 and in the local clock controllers 141, 142, 143 are reloaded with new initialization parameters. If the number of clock generators in any core-based design for test (CBDFT) module is high, a significant initialization overhead is incurred due to a large number of local clock controllers and hence a longer test execution time. In one example, initialization overhead is a measure of a priori steps needed to execute a test sequence properly.

For example, test points may be needed in the XLBIST design to boost test coverage, and each test point may require a test data capture in every capture window. Under typical LBIST behavior, test point clocks are activated one at a time which leads to inefficient usage of test points (i.e., many test patterns may not observe any test data being captured in some test points).

Figure 2:
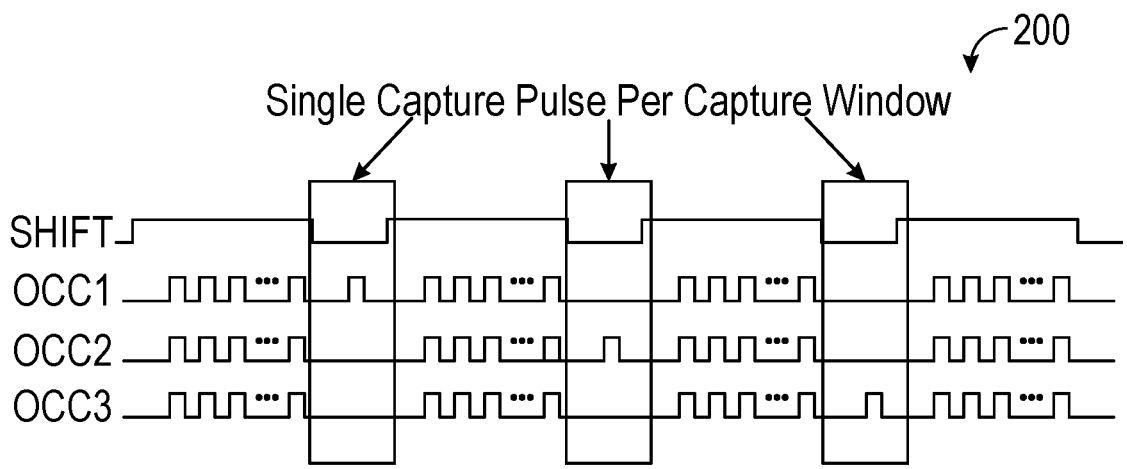
FIG. 2 illustrates an example capture window with a single capture pulse signal per capture window.

FIG. 2 illustrates an example capture window 200 with a single capture pulse signal per capture window. For example, a capture pulse signal is used to activate a single local clock controller for a single clock generator. In one example, there is a single clock generator for each clock domain.

Figure 3:
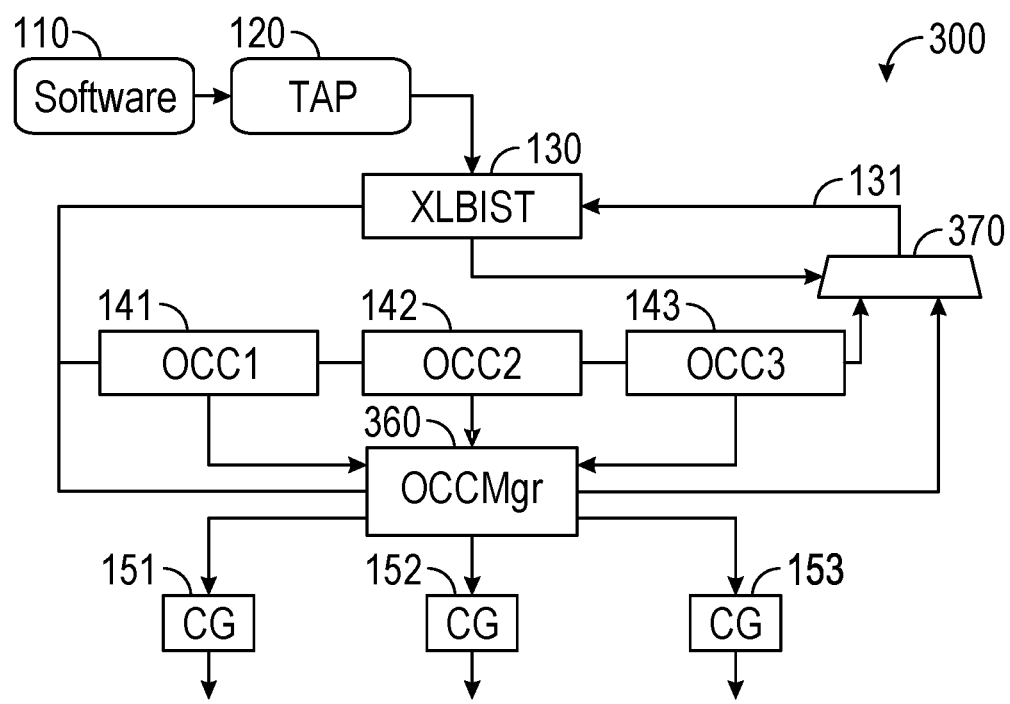
FIG. 3 illustrates an example block diagram of X-tolerant logical built-in self-test (XLBIST) architecture with a master clock controller.

FIG. 3 illustrates an example block diagram 300 of an X-tolerant logical built-in self-test (XLBIST) architecture with a master clock controller. In addition to elements already described in FIG. 1 (all with the same labels), a master clock controller 360 (also labeled as OCCMgr, for OCC Manager) is used to supervise the plurality of local clock controllers 141, 142, 143. For example, the master clock controller 360 operates as a single master clock controller for the XLBIST module 130 independent of the number of local clock controllers in the system. In one example, the number of local clock control load cycles is reduced significantly with the usage of the master clock controller which reduces test execution time.

In one example, the master clock controller 360 may activate all clock domains in a single capture window and may account for inter-clock domain timing constraints (e.g., ensuring proper delay between clock pulse signals to account for false paths and multi-cycle paths (MCPs). For example, test points may be enabled to capture test data in all capture windows which leads to a faster coverage by using test points efficiently. In one example, the master clock controller 360 may enable or disable one or more of the local clock controllers 141, 142, 143. In one example, the master clock controller 360 has the capability to manage directly the local clock controllers 141, 142, 143. In one example, the master clock controller 360 may be bypassed (i.e., put in bypass mode) and the local clock controllers 141, 142, 143 may be self-managed by a software test sequence, which may result in test time overhead.

In addition, a multiplexer 370 may be used to combine various signals from the master clock controller 360, the local clock controllers 141, 142, 143 and the XLBIST module 130. As shown in FIG. 3, the multiplexer 370 receives a first input from the master clock controller 360, one or more second input(s) from one or more of the local clock controllers 141, 142, 143, and a control input from XLBIST module 130. In response to the control input from XLBIST module 130, the multiplexer 370 can select an input from one of the local clock controllers 141, 142, 143, or the master clock controller 360, to output to the XLBIST module 130. For example, the multiplexer 370 may be implemented to bypass individual local clock controllers 141, 142, 143 in a default mode implementation.

In one example, each clock domain may include a plurality of clock generators which may operate synchronously. For example, the plurality of clock generators produces a plurality of clock signals. For example, the plurality of clock signals may be synchronous. In one example, the plurality of clock signals may each have a phase with a constant phase offset relative to each other.

Figure 4:
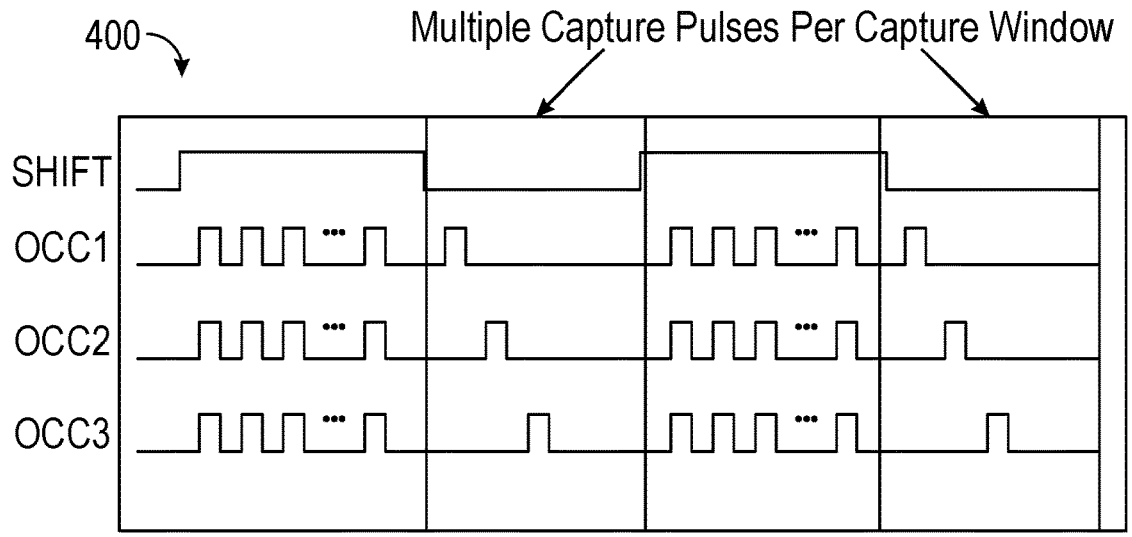
FIG. 4 illustrates an example capture window with multiple capture pulse signals per capture window.

FIG. 4 illustrates an example capture window 400 with multiple capture pulse signals per capture window. For example, a capture pulse signal is used to activate a single local clock controller for a single clock generator. In one example, there is a single clock generator for each clock domain. In another example, there are multiple clock generators for each clock domain.

Figure 5:
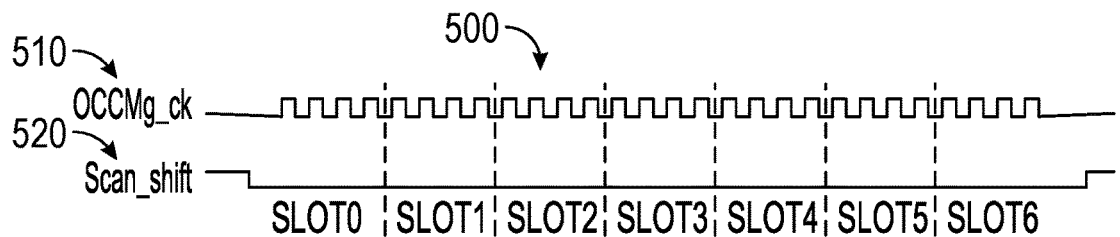
FIG. 5 illustrates an example functional model for a master clock controller.

FIG. 5 illustrates an example functional model 500 for a master clock controller. In one example, the master clock controller is programmed to supervise a plurality of clock generators (e.g., 28 clock generators) during a capture window. In one example, the master clock controller is designed to supervise a plurality of clock domains (e.g., 16 clock domains). For example, the master clock controller may be extended to manager a higher quantity or a lower quantity of clock domains.

In one example, the capture window may be divided into P time slots and each time slot may be sub-divided into Q time delays. For example, the product of P and Q equals N, the number of clock generators being supervised. For example, N=28 clock generators may be distributed into P=7 time slots and Q=4 time delays per time slot. For example, the master clock controller may use a first timing control signal (e.g., CLKSEL) to map different clock generators in a given time slot. For example, the master clock controller may use a second timing control signal (e.g., DELAYSEL) to position a clock signal leading edge into a time delay during each time slot for each clock generator clock signal. For example, the master clock controller may use a third timing control signal (e.g., BRANCHEN shown in FIG. 6) to activate or deactivate a clock generator during a time slot.

FIG. 5 shows a master clock signal 510 (e.g., OCCMgr_clk) which is distributed to a plurality of clock generators based on a clock schedule and a window signal 520 (e.g., scan_shift) which defines a capture window. In one example, the capture window starts when the window signal transitions to a LOW state and the capture window ends when the window signal transitions to a HIGH state. In one example, the clock schedule may be represented by a clock configuration table.

FIG. 5 also shows a clock configuration table which illustrates usage of the first timing control signal (e.g., CLKSEL) and the second timing control signal (e.g., DELAYSEL). For example, the first timing control signal may be represented as an 8-bit hexadecimal word (e.g., with a format 8'hXX) and may specify which clock generators are activated for each time slot. For example, the second timing control signal may be represented as a 2-bit binary word (e.g., with a format 2'bXX) and may specify a time delay (or relative time delay) for each time slot.

For example, FIG. 5 shows seven time slots, labeled as SLOT0, SLOT1, SLOT2, SLOT3, SLOT4, SLOT5, SLOT6 with four time delays, labeled as 0, 1, 2, 3. In one example, each clock domain (e.g., labeled as CLK0, CLK1, . . . , CLK15) may be ranked (i.e., ordered) based on an operation count (e.g., floating point operations, FLOPS) driven by each clock domain. In one example, some clock domains (e.g., CLK0, CLK1 and CLK2) may always be activated to ensure that a majority of logic cells gets test coverage. For example, if there is a timing skew issue among clock domains (e.g., CLK0, CLK1 and CLK2), then the second timing control signal (e.g., DELAYSEL) may be utilized to control relative timing by setting a time delay within a corresponding time slot to resolve the timing skew issue. For example, if the timing skew issue cannot be resolved using the second timing control signal, then the third timing control signal (e.g., BRANCHEN) may be utilized to deactivate a clock generator in a given time slot.

Figure 6:
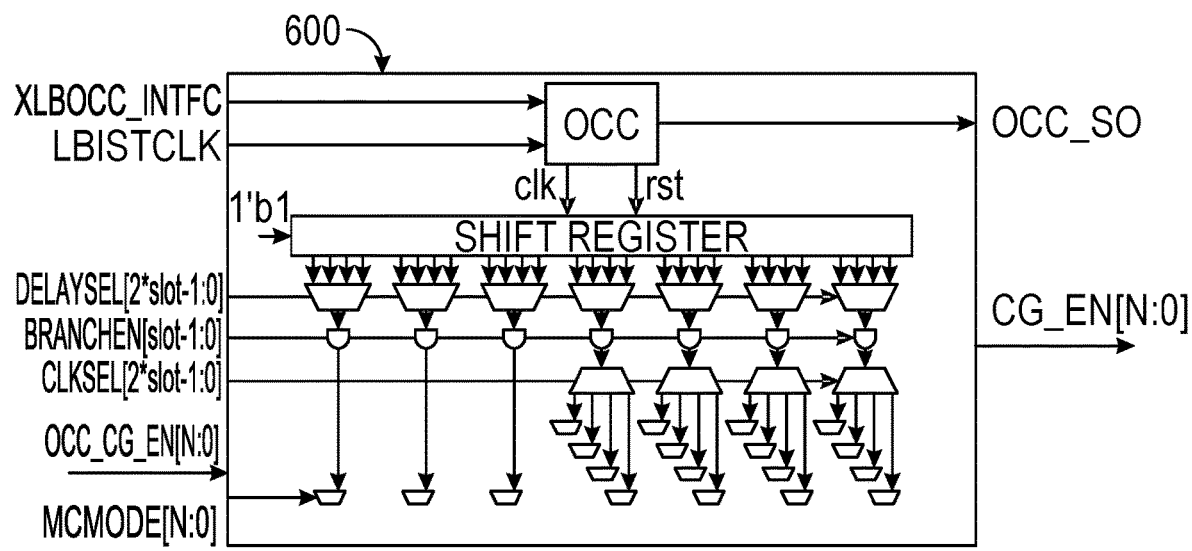
FIG. 6 illustrates an example block diagram of a master clock controller.

FIG. 6 illustrates an example block diagram 600 of a master clock controller. In one example, the master clock controller may manage a plurality (e.g., N) of clock domains within a single capture window. For example, N=16. For example, one design goal is to activate more frequently a subset of clock domains which have more operation counts (e.g., FLOPS). In one example, an activation frequency may be weighted by an operation count in each clock domain. For example, the master clock controller may manage a relative timing delay between two clock signals to manage any timing issues.

In one example, the master clock controller receives a reference clock clk from a local clock controller (e.g., OCC) which in turn receives an input clock LBISTCLK from the XLBIST module (not shown in FIG. 6). In one example, the local clock controller (e.g., OCC) may be one of the local clock controllers 141, 142, 143 illustrated in FIG. 3. In one example, the local clock controller (e.g., OCC) may be one of the local clock controllers illustrated in FIG. 7. In addition, the master clock controller receives a reset signal rst from the local clock controller. In one example, the reference clock clk and the reset signal rst are inputted into a shift register with a shift register data input. In one example, the shift register implements a walking-1 function, where the walking-1 function sequentially shifts a value of 1 through each shift register stage per reference clock cycle. For example, the shift register is controlled by a number of reference clock cycles during the capture window. In one example, outside of the capture window, the shift register is in a reset state. In one example, the shift register data input is denoted as 1'b1 which may be interpreted as a single binary digit with value=1. In one example, for each clock cycle of the reference clock clk, the shift register propagates the shift register data input one register per clock cycle. For example, the shift register includes N shift register outputs where N is the number of clock generators being supervised by the master clock controller.

In addition, the master clock controller receives an interface signal XLBOCC_INTFC from the XLBIST module and produces an output signal OCC_SO. In one example, the interface signal XLBOCC_INTFC is used to program an OCC register from the XLBIST controller. For example, the interface signal XLBOCC_INTFC may be based on an interface standard such as IEEE1500. In one example, the interface signal XLBOCC_INTFC may program the OCC register with various types of operations such as shift, capture, update, shift in (si), shift out (so), etc. For example, the output signal OCC_SO produces a shift out signal.

In one example, the master clock controller includes a plurality of input signals and a plurality of output signals used for clock management of a plurality of clock generators. For example, FIG. 6 shows the first timing control signal (e.g., CLKSEL) which maps different clock generators in a given time slot. For example, FIG. 6 also shows the second timing control signal (e.g., DELAYSEL) which positions a clock signal leading edge into a time delay during each time slot for each clock generator clock signal. For example, FIG. 6 also shows the third timing control signal (e.g., BRANCHEN) which activates or deactivates a clock generator during a time slot. In one example, the first timing control signal (CLKSEL) may be used to control a plurality of de-multiplexers to connect a single input to one of a plurality of outputs. In one example, the second timing control signal (DELAYSEL) may be used to control a plurality of multiplexers to connect one of a plurality of inputs to a single output.

For example, FIG. 6 also shows a local clock controller (e.g., OCC) enable signal OCC_CG_EN to select or deselect a local clock controller for a clock generator. For example, FIG. 6 also shows a master clock mode signal MCMODE for each clock generator. For example, FIG. 6 also shows a clock generator enable signal CG_EN for each clock generator. In one example, the master clock mode signal MCMODE implements a multi capture mode. For example, during the multi capture mode, the local clock controller enable signal OCC_CG_EN is blocked. For example, during the multiple capture mode each clock generator is enabled internally in the master clock controller. For each clock generator, if the master clock mode signal MCMODE=0, the master clock controller is bypassed and a legacy clock distribution may be implemented instead.

Figure 7:
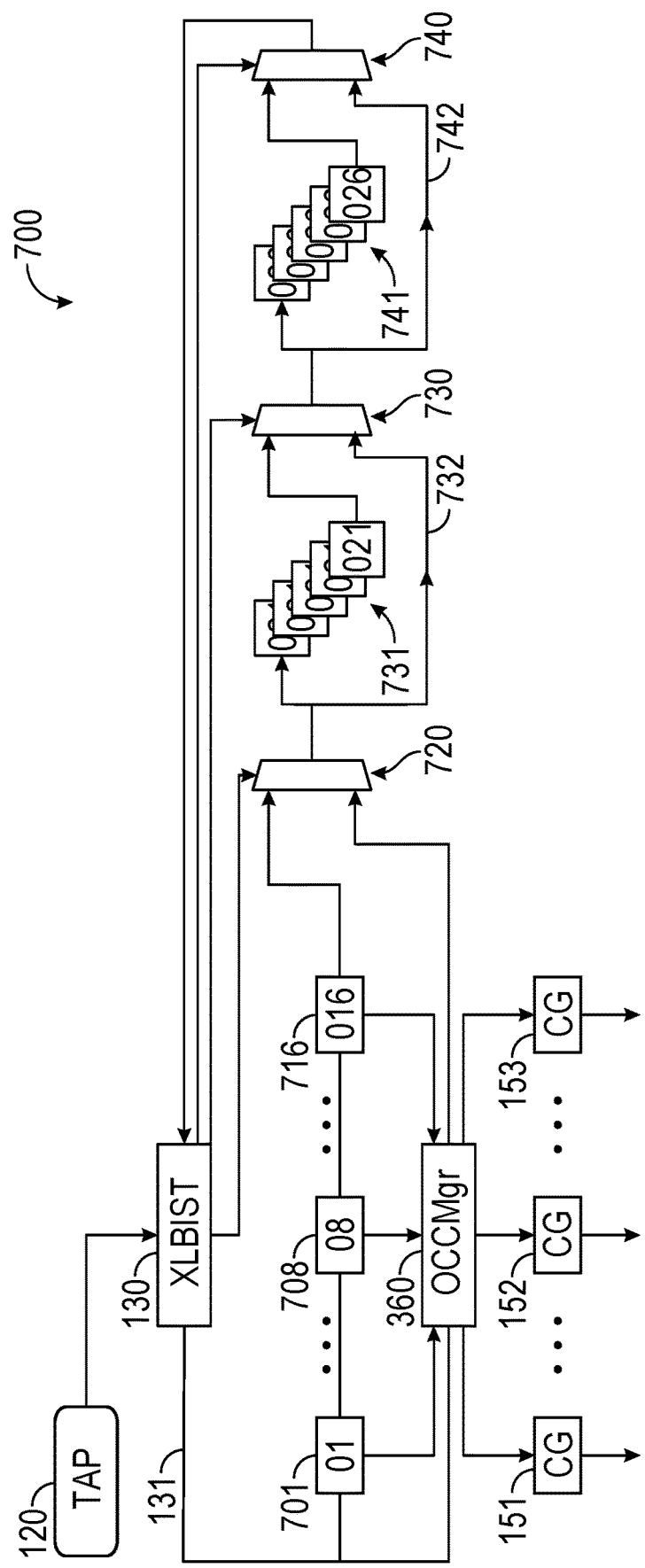
FIG. 7 illustrates an example block diagram of an on-chip clock controller (OCC) banking architecture.

FIG. 7 illustrates an example block diagram 700 of an on-chip clock controller (OCC) banking architecture, which may be adopted by the local clock controllers 141, 142, 143 in some implementations. In one example, an OCC banking architecture may be used to provide test coverage for all clock domains. For example, the master clock controller may manage up to N clock domains (e.g., N=16), but in certain applications there may be greater than N clock domains in total. For example, some clock domains may have minimal logic functions (e.g., less than 100 FLOPS), but may still require test coverage to avoid detecting any systematic faults in the IC. In one example, an OCC banking architecture approach may reduce initialization overhead for a given test sequence. For example, different sets of local clock controllers may be activated at different times to reduce initialization overhead without burdening the master clock controller to manage all clock generators at the same time.

In one example, a plurality of clock generators includes a plurality of dominant clock generators and a plurality of non-dominant clock generators. In one example, the plurality of dominant clock generators is used to generate a plurality of dominant clock domains. In one example, the plurality of non-dominant clock generators is used to generate a plurality of non-dominant clock domains. In one example, generating a plurality of clock signals using the plurality of clock generators generates a priority order for the plurality of dominant clock generators. In one example, the priority order of a clock is based on a number of logic cell flip-flops driven by that clock. For example, the priority order of the clock may be based on a potential quantity of faults to be detected. For example, a dominant clock domain may have a higher potential quantity of faults to be detected since it may have the highest proportion of logic cells in the IC. In one example, the capture window may target a plurality of dominant clock domains for each test pattern during the capture window for improved test coverage. In one example, a non-dominant clock domain may have a lower potential quantity of faults to be detected since it may have the lowest proportion of logic cells in the IC. In one example, generating a plurality of clocks using the plurality of clock generators activates at least one of the non-dominant clock generators with a bank-based clock controller chain. In one example, the dominant clock generators are clock generators managed by the master clock controller. In one example, the non-dominant clock generators are managed by the local clock controllers.

Certain components shown in FIG. 7 are the same components as those shown in FIGS. 1 and 2 and are thus labeled the same. In FIG. 7, a software module (not shown) provides instructions (e.g., management directives) and data through a test access port (TAP) 120 to a XLBIST module 130. In one example, the XLBIST module 130 provides management directives via a management bus 131 to a first local clock controller 701, a second local clock controller 702 (not shown), . . . i etc., an eighth local clock controller 708, . . . etc., including a sixteenth local clock controller 716.

For example, a master clock controller 360 (also labeled as OCCMgr, for OCC Manager) is used to manage the plurality of local clock generators 151, 152, 153, etc. For example, a multiplexer 720 aggregates and selects control signals from the XLBIST module 130, local clock controllers and master clock controller 360. In addition, the multiplexer 720 sends an output control signal to a first bank group 732 with a first bank of local clock controllers 731 and a first bank multiplexer 730 The first bank multiplexer 730 sends a first bank output control signal to a second bank group 742 with a second bank of local clock controller 741 and a second bank multiplexer 740. In one example, the second bank multiplexer 740 sends a second bank output control signal to the XLBIST module 130. In one example, the first bank group 732 may also include a first bank master clock controller. In one example, the second bank group 742 may also include a second bank master clock controller.

Figure 8:
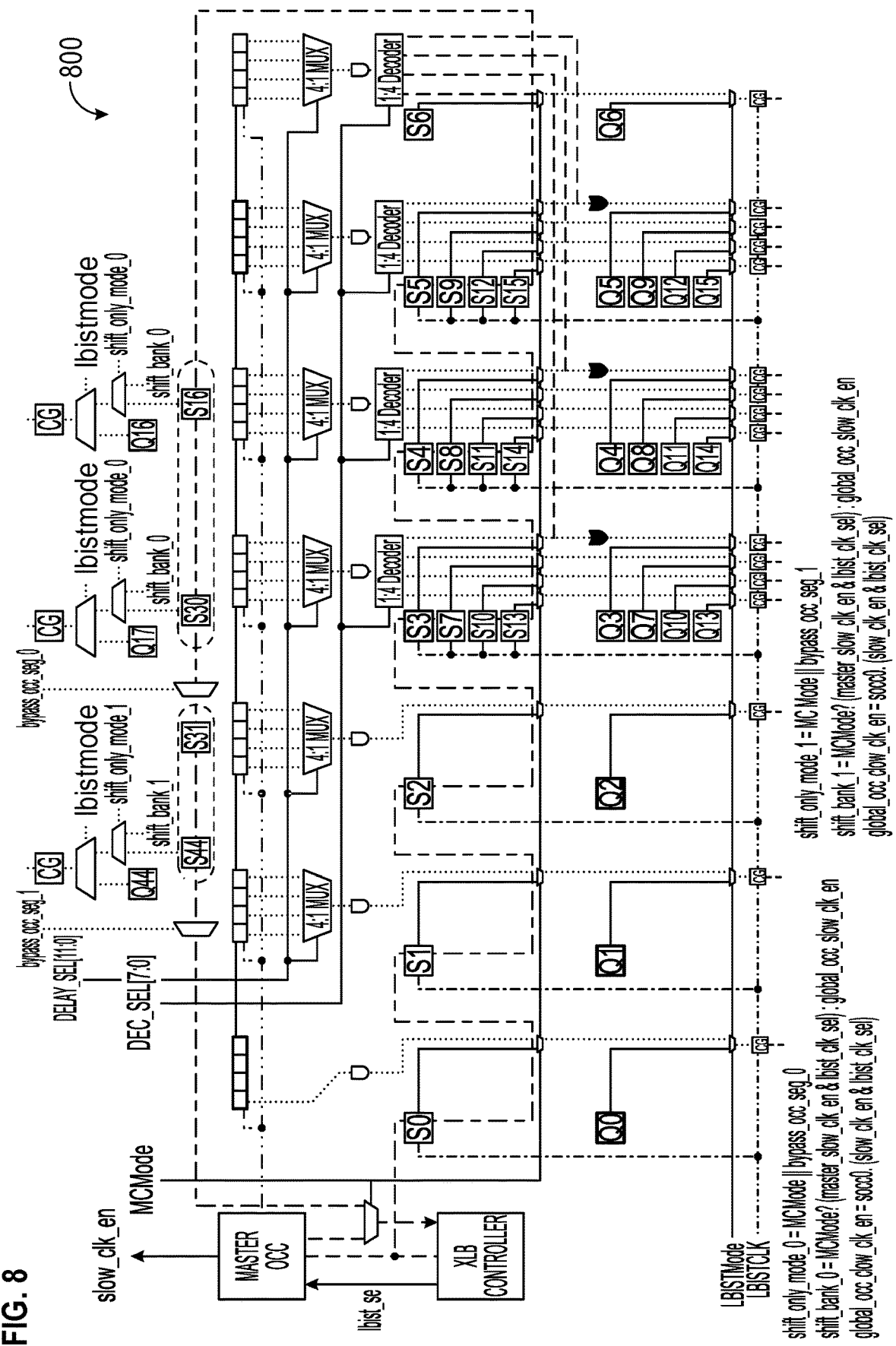
FIG. 8 illustrates an example functional diagram of an X-tolerant logical built-in self-test (XLBIST) architecture with a master clock controller.

FIG. 8 illustrates an example functional diagram 800 of an X-tolerant logical built-in self-test (XLBIST) architecture with a master clock controller. The functional diagram 800 shows various control inputs to supervise a plurality of clock generators using the master clock controller. In one example, FIG. 8 illustrates a low-level design implementation of a master clock controller with N=16 clock domains and P=7 time slots. For example, priority may be given to clock domains in the following order: 1, 2, 3, 4, . . . 16.

Figure 9:
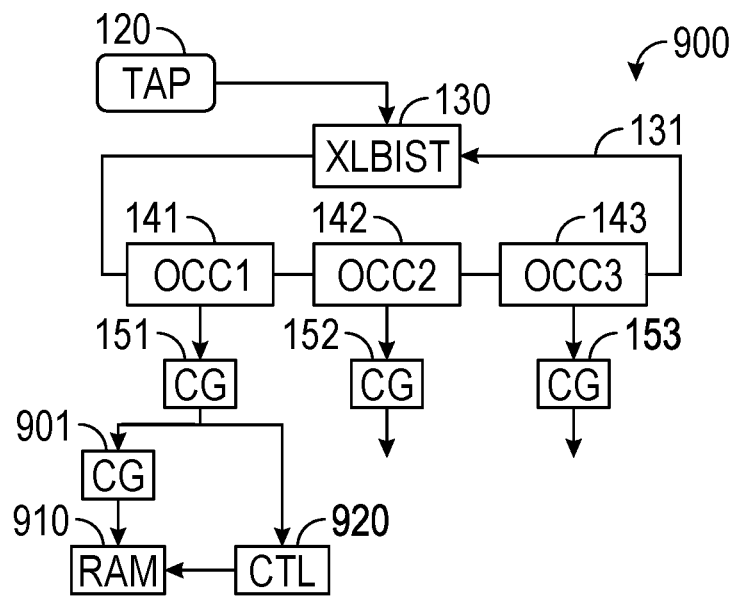
FIG. 9 illustrates an example block diagram of test coverage with an X-tolerant logical built-in self-test (XLBIST) architecture with local clock controllers.

FIG. 9 illustrates an example block diagram 900 of test coverage with an X-tolerant logical built-in self-test (XLBIST) architecture with local clock controllers. Certain components shown in FIG. 9 are the same components as those shown in FIGS. 1 and 2 and are thus labeled the same. A software module (not shown) provides instructions (e.g., management directives) and data through a test access port (TAP) 120 to a XLBIST module 130. In one example, the XLBIST module 130 provides management directives via a management bus 131 to a first local clock controller 141, a second local clock controller 142 and a third local clock controller 143.

For example, the first local clock controller 141 supervises a first clock generator 151, the second local clock controller 142 supervises a second clock generator 152 and the third local clock controller 143 supervises a third clock generator 153. In one example, the first clock generator 151 generates a first clock signal, the second clock generator 152 generates a second clock signal and the third clock generator 153 generates a third clock signal.

In one example, the XLBIST module 130 uses the local clock controllers 141, 142, 143 to supervise clock generation in each clock domain by following a conservative approach of activating a single local clock controller or a single clock generator during a capture window. In one example, a capture window is a contiguous time interval where test data is captured. For example, this approach may facilitate managing timing exceptions (e.g., x-sources) during the capture window due to inter-clock domain false paths. In some examples, this approach may create a large test time overhead in ICs with a large number of clock domains.

In addition, FIG. 9 shows an auxiliary clock generator 901 coupled to the first clock generator 151 as well as a controller 920 coupled to the first clock generator 151. In one example, the auxiliary clock generator 901 and the controller 920 are both coupled to a memory (e.g., a random access memory (RAM)) 910.

In one example, the XLBIST module 130 may not execute a test sequence efficiently if there are unknown logic-(e.g., logic or x-sources) in logic cells under test in the test sequence. For example, a CPU subsystem may be a major source of unknown logic (e.g., may require a hold at a write interface of a memory). For example, due to unknown logic, certain test paths in the logic cells under test are capture masked and unobservable in the test sequence. In one example, scan-based testing has two phases: a shift phase and a capture phase. For example, during the shift phase all operations of design are loaded and during the capture phase, the operations are executed and test faults are captured. In one example, during the capture phase some logic cells, known as x-logic, have erroneous sampling which should be ignored (e.g., labeled as x-logic). For example, to minimize generation of spurious test faults, capturing is disabled on the x-logic by disabling a clock signal or gating the x-logic to known values.

Figure 10:
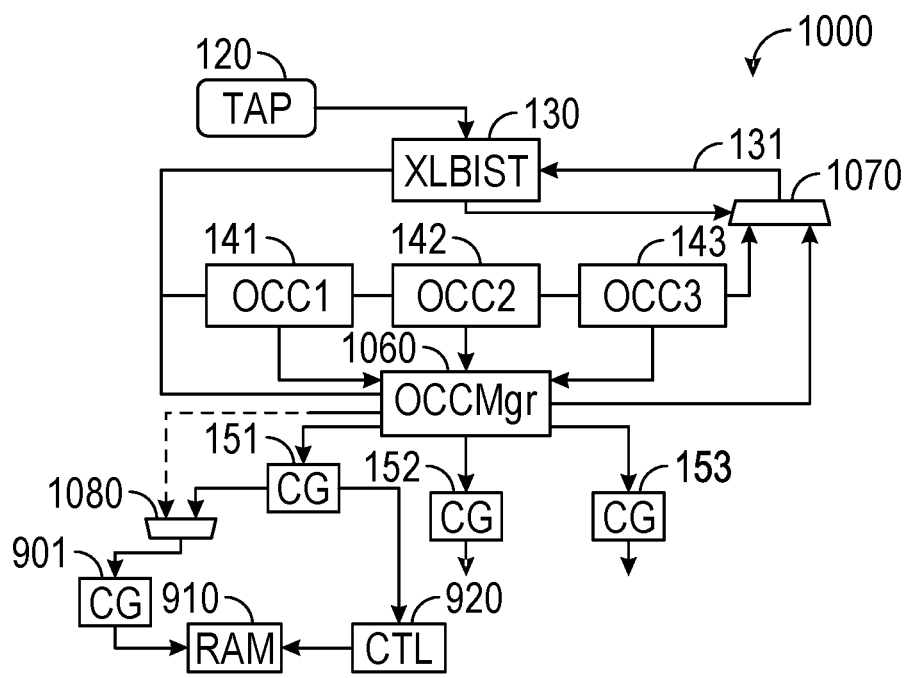
FIG. 10 illustrates an example block diagram 1000 of test coverage with an X-tolerant logical built-in self-test (XLBIST) architecture with a master clock controller.

FIG. 10 illustrates an example block diagram 1000 of test coverage with an X-tolerant logical built-in self-test (XLBIST) architecture with a master clock controller. Several components shown in the example block diagram 1000 of FIG. 10 are the same as those already described in FIG. 9 and bear the same labels. In one example, a master clock controller 1060 (labeled as OCCMgr) is used to supervise the plurality of local clock controllers 141, 142, 143. For example, the master clock controller 1060 operates as a single master clock controller for the XLBIST module 130 independent of the number of local clock controllers in the system.

For example, a first multiplexer 1070 may be used to select control signals from the master clock controller 1060 or the third local clock controller 143 and send the control signals to the XLBIST module 130. For example, a second multiplexer 1080 may be used to select signals from the master clock controller 1060 or the first clock generator 151. In one example, the master clock controller 1060 helps in recovering test coverage by staggering the clock generators which have a HOLD violation. In one example, a HOLD violation is a timing failure which occurs at a clock signal edge and cannot be managed in the design. For example, if a HOLD violation exists in the logic cells, then erroneous test data may be captured and the logic cells may be considered as x-logic.

FIG. 11 illustrates example test performance comparisons 1100 for three subsystems using conventional and improved X-tolerant logical built-in self-test (XLBIST) architectures. In one example, three subsystems from an IC are a display subsystem, a safety manager subsystem and a CPU subsystem. In one example, test performance in terms of test coverage, number of test patterns, number of reseeds and run time are compared for both conventional and improved XLBIST architectures. For example, run time for the display subsystem improved from 12.3 ms for the convention XLBIST architecture to 5.3 ms for the improved XLBIST architecture. For example, run time for the safety manager subsystem improved from 35 ms for the convention XLBIST architecture to 10 ms for the improved XLBIST architecture. For example, pattern generation for the CPU subsystem was not possible for the conventional XLBIST architecture, due to multi-cycle paths in memory circuitry, but pattern generation was possible for the improved XLBIST architecture after implementing a master clock controller. One skilled in the art would understand that the performance numbers disclosed herein are only examples and that specific performance improvements may depend on may factors and conditions of the system.

Figure 12:
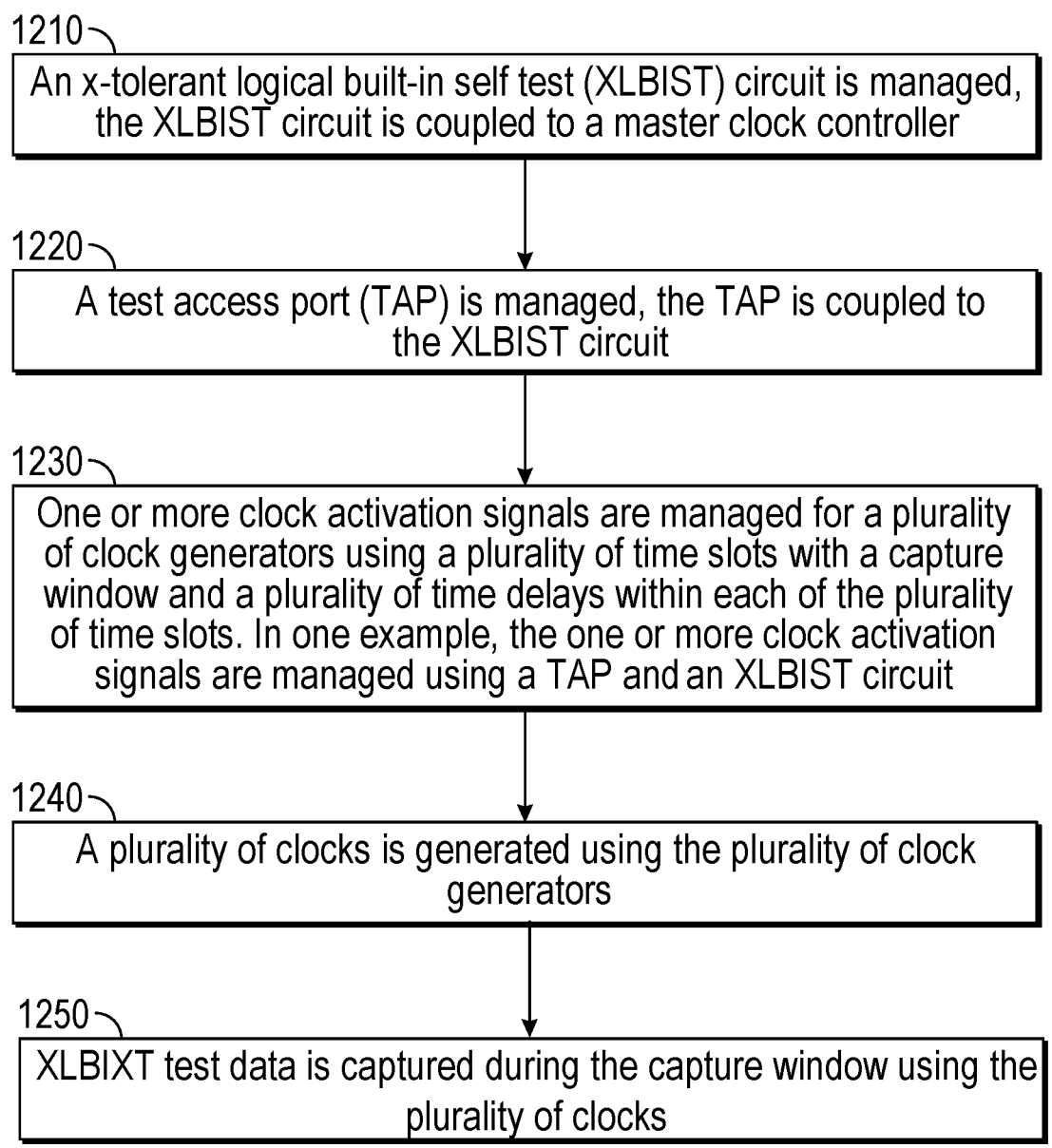
FIG. 12 illustrates an example flow diagram 1200 for clock management using an X-tolerant logical built-in self test (XLBIST) architecture with a master clock controller.

FIG. 12 illustrates an example flow diagram 1200 for clock management using an X-tolerant logical built-in self test (XLBIST) architecture with a master clock controller. In block 1210, an X-tolerant logical built-in self test (XLBIST) circuit is managed, the XLBIST circuit is coupled to a master clock controller. In one example, managing the XLBIST circuit configures the XLBIST circuit to manage an operation of the master clock controller. In one example, managing the XLBIST circuit includes loading instructions and data for managing a plurality of clock domains. In one example, the instructions are management directives. In one example, the management directives specify a test sequence. For example, the management directives may activate and deactivate a plurality of clock domains. For example, each clock domain includes one or more clock generators. For example, each clock domain includes a plurality of logic cells or memory cells.

In block 1220, a test access port (TAP) is managed, the TAP is coupled to the XLBIST circuit. In one example, managing the TAP configures the TAP to allow access to the XLBIST circuit. In one example, the loading of instructions and data uses a test access port (TAP). In one example, the loading of instructions and data is from a software module.

In block 1230, one or more clock activation signals are managed for a plurality of clock generators using a plurality of time slots with a capture window and a plurality of time delays within each of the plurality of time slots. In one example, the one or more clock activation signals are managed using a TAP and an XLBIST circuit. In one example, managing the one or more clock activation signals comprises enabling or disabling the one or more clock activation signals. In one example, managing the one or more clock activation signals for the plurality of clock generators uses the master clock controller. In one example, managing the one or more clock activation signals for the plurality of clock generators manages a plurality of local clock controllers. In one example, each one or more of the clock activation signals is active within at least one of the plurality of time slots within the capture window. In one example, each one or more of the clock activation signals is active after one of the plurality of time delays within each of the plurality of time slots. In one example, each clock domain may operate synchronously (i.e., operated with constant phase offsets among them). For example, the plurality of clock generators produces a plurality of clock signals. For example, the plurality of clock signals may be synchronous. In one example, each of the plurality of clock signals has a clock phase with a constant phase offset relative to each other. In one example, the capture window is partitioned into a plurality of time slots. In one example, each time slot is partitioned into a plurality of time delays. For example, the time slots are contiguous. For example, the time delays within each time slot are contiguous. In one example, each clock domain comprises a plurality of logic cells or memory cells which operate synchronously. In one example, the time slot is selected by a slot control signal and the time delay is selected by a delay control signal. For example, the time slot and the time delay are based on the loaded instructions and data.

In block 1240, a plurality of clocks is generated using the plurality of clock generators. In one example, the plurality of clock generators comprises a plurality of dominant clock generators and a plurality of non-dominant clock generators. In one example, the plurality of dominant clock generators is used to generate a plurality of dominant clock domains. In one example, the plurality of non-dominant clock generators is used to generate a plurality of non-dominant clock domains. In one example, generating a plurality of clocks using the plurality of clock generators generates a priority order for the plurality of dominant clock generators. In one example, the priority order is based on the number of floating point operations per second (FLOPS) in each of the plurality of dominant clock domains. In one example, generating a plurality of clocks using the plurality of clock generators activates at least one of the non-dominant clock generators with a bank-based clock controller chain. In one example, the dominant clock generators are clock generators managed by the master clock controller. In one example, the non-dominant clock generators are managed by the local clock controllers.

In block 1250, capture XLBIST test data during the capture window using the plurality of clocks. In one example, run a test diagnostic procedure using the captured XLBIST test data to validate performance of logic cells in the IC. In one example, XLBIST test data is generated by the XLBIST circuit. In one example, the captured XLBIST test data is observed by the XLBIST controller using a multiple input shift register (MISR) which captures a MISR signature. If the logic cells have a fault, then the MISR signature may fail. For example, the fault may be observed directly through test pins of the IC (e.g., a test access port) during an automated test pattern generation (ATPG) scan.

In one aspect, one or more of the steps for providing clock management of integrated circuits (ICs) in FIG. 12 may be executed by one or more processors which may include hardware, software, firmware, etc. In one aspect, one or more of the steps in FIG. 12 may be executed by one or more processors which may include hardware, software, firmware, etc. The one or more processors, for example, may be used to execute software or firmware needed to perform the steps in the flow diagram of FIG. 12. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for clock management of integrated circuits (ICs). Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The invention claimed is:

1. A clock management apparatus for built-in self-test (BIST) circuitry, comprising
  a plurality of local clock controllers;
  a master clock controller coupled to the plurality of local clock controllers;
  a plurality of clock generators coupled to the master clock controller;
  an X-tolerant logical built-in self test (XLBIST) circuit coupled to the master clock controller; and
  a test access port (TAP) coupled to the XLBIST circuit.

2. The clock management apparatus of claim 1, wherein the master clock controller is configured to enable or disable one or more clock activation signals.

3. The clock management apparatus of claim 1, wherein the master clock controller is configured to manage one or more clock activation signals for the plurality of clock generators using a plurality of time slots within a capture window and a plurality of time delays within each of the plurality of time slots.

4. The clock management apparatus of claim 1, wherein at least one of the plurality of local clock controllers is configured to manage at least one of the plurality of clock generators.

5. The clock management apparatus of claim 1, wherein the XLBIST circuit is configured to manage an operation of the master clock controller and the TAP is configured to allow access to the XLBIST circuit.

6. The clock management apparatus of claim 5, wherein the access to the XLBIST circuit through the TAP allows configuring a management of the operation of the master clock controller.

7. The clock management apparatus of claim 1, wherein the plurality of clock generators includes at least one dominant clock generator and at least one non-dominant clock generator, wherein the at least one dominant clock generator includes at least one dominant clock domain and the at least one non-dominant clock generator includes at least one non-dominant clock domain.

8. The clock management apparatus of claim 7, wherein the at least one dominant clock generator is ranked in a priority order.

9. The clock management apparatus of claim 8, wherein the priority order is based on a number of floating point operations per second (FLOPS) in each of the at least one dominant clock domain.

10. The clock management apparatus of claim 7, wherein the at least one non-dominant clock generator is configured to activate using a bank-based clock controller chain.

11. The clock management apparatus of claim 1, further comprising a multiplexer coupled to the master clock controller and the plurality of local clock controllers.

12. A method for clock management for a built-in self-test (BIST) circuitry comprising:
  managing one or more clock activation signals for a plurality of clock generators using a plurality of time slots within a capture window and a plurality of time delays within each of the plurality of time slots; and
  generating a plurality of clocks using the plurality of clock generators.

13. The method of claim 12, wherein the managing the one or more clock activation signals comprises enabling or disabling the one or more clock activation signals.

14. The method of claim 12, further comprising managing a plurality of local clock controllers.

15. The method of claim 14, wherein the plurality of clock generators comprises a plurality of dominant clock generators and a plurality of non-dominant clock generators.

16. The method of claim 15, further comprising using the plurality of non-dominant clock generators to generate a plurality of non-dominant clock domains.

17. The method of claim 16, further comprising activating at least one of the plurality of non-dominant clock generators with a bank-based clock controller chain.

18. The method of claim 15, further comprising using the plurality of dominant clock generators to generate a plurality of dominant clock domains.

19. The method of claim 18, further comprising generating a priority order for the plurality of dominant clock generators.

20. The method of claim 19, where the priority order is based on a number of floating point operations per second (FLOPS) in each of the plurality of dominant clock domains.

21. The method of claim 14, wherein each of the one or more clock activation signals is active within at least one of the plurality of time slots within the capture window.

22. The method of claim 21, wherein the each of the one or more clock activation signals is active after one of the plurality of time delays within each of the plurality of time slots.

23. The method of claim 12, further comprising managing the plurality of clock generators using a master clock controller.

24. The method of claim 23 further comprising managing an X-tolerant logical built-in self test (XLBIST) circuit coupled to the master clock controller.

25. The method of claim 24, further comprising managing a test access port (TAP) coupled to the XLBIST circuit.

26. The method of claim 25, further comprising configuring the XLBIST circuit to manage an operation of the master clock controller and configuring the TAP to allow access to the XLBIST circuit.

27. An apparatus for clock management for a built-in self-test (BIST) circuitry comprising:
- means for managing one or more clock activation signals for a plurality of clock generators using a plurality of time slots within a capture window and a plurality of time delays within each of the plurality of time slots; and
- means for generating a plurality of clocks using the plurality of clock generators.

28. The apparatus of claim 27, further comprising means for managing the plurality of clock generators and means for managing the at least one of the plurality of clock generators using one of the plurality of time delays.

29. A non-transitory computer-readable medium storing computer executable code, operable on a device comprising at least one processor and at least one memory coupled to the at least one processor, wherein the at least one processor is configured to implement a clock management for a built-in self-test (BIST) circuitry, the computer executable code comprising:
- instructions for causing a computer to manage one or more clock activation signals for a plurality of clock generators using a plurality of time slots within a capture window and a plurality of time delays within each of the plurality of time slots; and
- instructions for causing the computer to generate a plurality of clocks using the plurality of clock generators.

30. The non-transitory computer-readable medium of claim 29, further comprising instructions for causing the computer to manage the at least one of the plurality of clock generators using one of the plurality of time delays.

* * * * *